3,219,675
PREPARATION OF α,ω-ALKANDIOIC ACIDS AND ω-FORMYLALKANOIC ACIDS
Richard Seekircher, Lake Charles, La., assignor to Columbian Carbon Company, a corporation of Delaware
No Drawing. Filed Nov. 2, 1961, Ser. No. 149,531
9 Claims. (Cl. 260—398)

This invention relates to a method for the concurrent production of an α,ω-alkandioic acid and an ω-formylalkanoic acid from the cycloalkene corresponding thereto.

More specifically, the process of the instant invention is concerned with the preparation of α,ω-alkandioic acids of the general formula, $HO_2C-(CH_2)_n-CO_2H$, wherein $n$ has a value of from 4 to 10, and the concurrent preparation of ω-formylalkanoic acids of the general formula, $OHC-(CH_2)_n-CO_2H$, wherein $n$ has the value set forth above.

Essentially, the subject process comprises the steps of (1) ozonizing in a reactive solvent a cycloalkene of the general formula

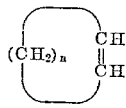

wherein $n$ has the values given above, (2) thermally decomposing or cleaving the cycloalkene ozonide in the absence of any added oxidizing or reducing agent and (3) recovering the ω-formylalkanoic acid and α,ω-alkandioic acids so formed. Exemplary of such a process is the treatment of cyclododecene with ozone to form cyclododecene ozonide. The cyclododecene ozonide is then thermally cleaved in the absence of any added oxidizing or reducing agent. The resulting reaction product consists essentially of equivalent quantities of 1,12-dodecandioic acid and 11-formylundecanoic acid. The acid products may be separated and recovered according to a variety of purification methods.

Processes involving the ozonization of cycloalkenes are shown in the prior art, as well as processes involving the decomposition of the cycloalkene ozonides. However, the prior art processes of decomposing the cycloalkene ozonides involve the use of an added oxidizing agent or reducing agent in the decomposition step. Thus, depending upon whether oxidizing or reducing conditions are used in the decomposition step, the principal products obtained are either an α,ω-alkandioic acid or an α,ω-alkandial. For example, when cyclooctene ozonide is oxidatively decomposed by passing oxygen or a mixture of oxygen and ozone through the ozonide, the resulting product is suberic (octandioic) acid. When cyclooctene ozonide is reductively decomposed in the presence of a reducing agent, such as hydrogen, the resulting product is suberdialdehyde (octandial).

It has now been found that when a cycloalkene ozonide is decomposed in the absence of an added oxidizing or reducing agent, substantial quantities of the α,ω-alkandioic acid and of the ω-formylalkanoic acid are obtained. Thus, when cyclooctene ozonide is decomposed, the reaction product consists essentially of suberic acid and 7-formylheptanoic acid.

Although lower yields of the alkandioic acid are obtained by the process of the instant invention than are obtained when an added oxidizing agent is used, these lower yields are more than compensated for by the yields of the ω-formylalkanoic acid. The ω-formylalkanoic acids are valuable intermediates. Thus, for example, they may easily be converted to the corresponding ω-aminoalkanoic acid or to the corresponding ω-hydroxyalkanoic acid.

The first step of the subject process consists of effecting the reaction of the cycloalkene with ozone and is carried out in the presence of a reactive solvent, such as propionic acid. The ozonization is carried out in the temperature range of from about —30° C. to about +30° C.

The second step of the subject process involves the thermal decomposition of the cycloalkene ozonide; this is accomplished by heating the solution of the cycloalkene ozonide in the reaction solvent to a temperature in the range of from about 80° C. to 140° C. No added oxidizing or reducing agent is used in this step. However, it is theorized that the peroxides formed in the ozonization step are sufficient to oxidize a part of the cycloalkene ozonide to the α,ω-alkandioic acid.

The third step is the separation and purification of the reaction products. This involves separation of the reactive solvent from the reaction product, such as by vacuum distillation to remove the more volatile solvent. This is followed by a suitable process for the separation of the diacid and the aldehyde-acid, such as fractional distillation.

A clearer understanding of the process of the instant invention may be obtained from the examples given below, which disclose the presently preferred mode of carrying out this invention.

*Example 1*

A mixture of 30 grams of impure cyclooctene (containing 4% cyclooctane) and 70 grams of propionic acid was placed in a Mini-Lab reactor equipped with an efficient stirring device and a reflux condenser. This mixture was cooled to 15° C., and an oxygen stream containing 3 to 4% ozone was passed through at a rate of 1 liter/minute. When the cyclooctene was saturated with ozone, as indicated by a potassium iodide trap the oxygen/ozone flow was stopped. The reaction mixture was heated slowly to 100° C. and maintained at this temperature for one hour. Small amounts of water were added to the reaction mixture to check the highly exothermic reaction and maintain a constant reaction temperature. The propionic acid solvent was removed by vacuum distillation. The crude reaction mixture consisted of 44% suberic acid, 46% 7-formylheptanoic acid and 10% neutral components. The suberic acid was separated from the 7-formylheptanoic acid and neutral components by extraction with benzene. The suberic acid was insoluble in benzene, whereas the 7-formylheptanoic acid and neutral components were soluble. The 7-formylheptanoic acid was purified by treatment with sodium bicarbonate solution. The 2,4-dinitrophenylhydrazone of 7-formylheptanoic acid had a M.P. 164–166° C., while the boiling point of methyl 7-formylheptanoate was 100–102° C. at 1.6 mm.

*Example 2*

A starting mixture of 5 grams impure cyclooctene (4% cyclooctane) and 95 grams of propionic acid was treated with ozone as given in Example 1, except the ozonization temperature was —20° C. The cyclooctene ozonide was decomposed and reaction products separated as in Example 1. The crude reaction mixture consisted of 37% suberic acid, and 49% 7-formylheptanoic acid.

*Example 3*

When cyclododecene is ozonized and the ozonide decomposed by the general procedure given in Example 1, substantial quantities of dodecandioic acid and 11-formylundecanoic acid will be formed.

Results similar to the above will be obtained when other cycloalkenes, such as cyclohexene, cyclodecene and cycloheptene, are ozonized and thermally decomposed in the absence of an added oxidizing or reducing agent. Thus, for example, when cyclohexene is used as the starting cycloalkene, the products will be adipic acid and 5-formylpentanoic acid.

The α,ω-alkandioic acids produced as one of the major reaction products of the process of the instant invention are those corresponding to the following general formula $$HO_2C-(CH_2)_n-CO_2H$$

wherein $n$ has a value of from 4 to 10. Examples of such α,ω-alkandioic acids include adipic (hexandioic), sebacic (decandioic) and azelaic (nonandioic) acids.

The ω-formylalkanoic acids produced as the other major component of the reaction products are those corresponding to the general formula $$OHC-(CH_2)_n-CO_2H$$

wherein $n$ has a value of from 4 to 10. Examples of such ω-formylalkanoic acids include 5-formylpentanoic acid, 9-formylnonanoic acid and 8-formyloctanoic acid.

The cycloalkenes which may be converted to their corresponding α,ω-alkandioic acid and ω-formylalkanoic acid according to the process of the instant invention are those corresponding to the following general formula

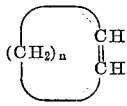

wherein $n$ has a value of from 4 to 10. Examples of such cycloalkenes include cyclohexene, cyclododecene, cyclooctene, cycloheptene, cycloundecene, cyclodecene and cyclononene.

The ozonization of the cycloalkene may be affected by any of the processes usually used for ozonization. The addition of ozone to an ethylenic double bond is a well known reaction and has been reviewed by Long [Chem. Reviews 27, 437–93 (1940)] and Bailey [Chem. Reviews 58, 925–1010 (1958)]. Preferably a gaseous mixture of from about 3% to about 4% ozone in oxygen or air is passed through a solution of the cycloalkene in a reactive solvent. The ozonization temperature may be in the range of from about −30° C. to about +30° C., preferably from about −20° C. to about 0° C. The reaction time for the ozonization will depend upon the concentration of cycloalkene and upon the amount of ozone in the gaseous mixture. As is common in the art, the gaseous mixture of ozone is passed through the reaction mixture until saturation of the double bond is apparent from ozone being present in the gaseous mixture after passing through the reaction mixture.

The concentration of cycloalkene in the reactive solvent may vary from about 2% to about 40%. Preferably concentrations of cycloalkene in reactive solvent of from about 4% to about 20% are used.

Suitable reactive solvents for use in the process of the instant invention are the lower monocarboxylic acids, such as formic, acetic, propionic, and butyric acid. Although higher monocarboxylic acids, such as valeric and heptanoic, may be used, difficulties encountered in their separation from the reaction products make them less desirable as reaction media.

As has been indicated, the cycloalkene used as the starting material need not be pure but may contain small amounts of impurities such as the corresponding cycloalkane and/or the corresponding cycloalkadiene. Small amounts of other impurities not deleterious to the reaction may also be present. Polymerization inhibitors which may be present in the cycloalkene need not be removed from the cycloalkene before reaction. Thus, for example, t-butyl catechol is commonly present in cyclooctene as a polymerization inhibitor, and indications are that there are no adverse effects.

The thermal cleavage of the cycloalkene ozonide is effected by heating the reaction mixture from the ozonization step to a temperature range of from about 80° C. to about 140° C., preferably from about 100° C. to 120° C. Reaction times of from about 15 minutes to about 60 minutes are sufficient for the thermal decomposition step. Usually a small amount of water is added to the reaction mixture during the course of the decomposition to prevent an undue rise in the reaction temperature due to the highly exothermic reaction.

As may be ascertained from the above examples and discussion, the cleavage of the cycloalkene ozonide is effected without the addition of an oxidizing or reducing agent to the reaction mixture during the cleavage step. However, an oxidizing agent, ozone or a mixture of ozone and oxygen is, of course, added during the formation of the cycloalkene ozonide. The formation of oxidation products during the cleavage step indicates some oxidation occurs during this step. This oxidation is presumably due to either peroxide formation during the ozonization step or the dissolving of oxygen and/or ozone in the solvent.

The addition of water to the reaction mixture during the decomposition step, serves only the purpose of controlling the temperature of the reaction. Depending upon the particular systems involved, water in amounts of from about 2% to about 5% by weight the reaction mixture, are used.

Separation and purification of the reaction mixture may be effected by a variety of methods. Advantageously, the monocarboxylic acid solvent is removed by vacuum distillation and the diacid and aldehyde-acid separated by extraction with a non-polar organic solvent, such as benzene, carbon tetrachloride, or chloroform. Alternatively after separation of the solvent, the diacid and the aldehyde-acid may be separated by fractional distillation or fractional crystallization. Separation of the diacid and the aldehyde-acid may, also, be effected by utilizing derivatives of the aldehyde function of the aldehyde-acid. Thus, for example, derivatives such as the bisulfite addition compounds, or oxime or semi-carbazone, may be prepared and utilized in the separation process. Or the aldehyde-acid may be separated by forming the sodium salt of the acid function and extracting with an organic solvent, such as benzene, carbon tetrachloride, or chloroform. The sodium salt of the aldehyde-acid is soluble in such solvents, whereas the acid salts are not.

I claim:
1. A process for the preparation of an ω-formylalkanoic acid of the formula, $OHC-(CH_2)_n-CO_2H$, wherein $n$ has a value of from 4 to 10, and the α,ω-alkandioic acid corresponding thereto, of the formula,

$$HO_2C-(CH_2)_n-CO_2H$$

wherein $n$ has the value as given above, which comprises the steps of (1) ozonizing a cycloalkene of the general formula,

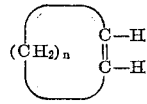

wherein $n$ has the value given above, by contacting ozone with a solution containing from about 2 percent to about 40 percent of said cycloalkene in a saturated lower monocarboxylic acid as a solvent at a reaction temperature within the range of from about −30° C. to about +30° C., (2) forming the said ω-formylalkanoic acid and said α,ω-alkanoic acid by heating a reaction mixture consisting essentially of the reaction mixture obtained in step (1) with up to about 5 percent added water, at a reaction temperature of from about 80° C. to about 140° C., and (3) separating the so formed ω-formylalkanoic acid and α,ω-alkandioic acid.

2. The process of claim 1, wherein the saturated lower monocarboxylic acid solvent is propionic acid.

3. The process of claim 1, wherein the saturated lower monocarboxylic acid solvent is acetic acid.

4. A process for the preparation of 11-formylundecanoic acid and α,ω-dodecandioic acid which comprises the steps of (1) ozonizing cyclododecene, by contacting ozone with a solution containing from about 2 percent of about 40 percent of cyclododecene in a saturated lower monocarboxylic acid as a solvent at a reaction temperature within the range of from about −30° C. to about +30° C., (2) forming 11-formylundecanoic acid and α,ω-dodecadoic acid by heating a reaction mixture consisting essentially of the reaction mixture obtained in step (1) with up to about percent added water, at a reaction temperature of from about 80° C. to about 140° C. and (3) separating the so formed 11-formylundecanoic acid and α,ω-dodecandioic acid.

5. The process of claim 4, wherein the saturated lower monocarboxylic acid solvent is propionic acid.

6. The process of claim 4, wherein the saturated lower monocarboxylic acid solvent is acetic acid.

7. A process for the preparation of 7-formylheptanoic acid and suberic acid which comprises the steps of (1) ozonizing cyclooctene, by contacting ozone with a solution containing from about 2 percent to about 40 percent of cyclooctene in a saturated lower monocarboxylic acid such as a solvent at a reaction temperature within the range of from about −30° C. to about +30° C., (2) forming 7-formylheptanoic acid and suberic acid by heating a reaction mixture consisting essentially of the reaction mixture obtained in step (1) with up to about 5 percent added water, at a reaction temperature of from about 80° C. to about 140° C., and (3) separating the so formed 7-formylheptanoic acid and suberic acid.

8. The process of claim 7, wherein the saturated lower monocarboxylic acid solvent is propionic acid.

9. The process of claim 7, wherein the saturated lower monocarboxylic acid solvent is propionic acid.

References Cited by the Examiner

UNITED STATES PATENTS 2,865,937   12/58   Maggiolo _____ 260—406

OTHER REFERENCES

Bailey: Ind. and Eng. Chem., vol. 50, No. 7, July 1958, pages 993–996.

Harries et al.: Ber. Deut. Chem. 41, 1701–1711 (1908).

Mottier: Helv. Chim Acta. 14, 1080–1090 (1931).

Rieche et al.: Liebig's Annalen 553, 241–246 (1942).

CHARLES B. PARKER, *Primary Examiner.*

DANIEL D. HORWITZ, *Examiner.*

UNITED STATES PATENT OFFICE
CERTIFICATE OF CORRECTION

Patent No. 3,219,675　　　　　　　　　　　　　　November 23, 1965

Richard Seekircher

It is hereby certified that error appears in the above numbered patent requiring correction and that the said Letters Patent should read as corrected below.

Column 5, line 13, after "about" insert -- 5 --; line 26, strike out "such"; column 6, line 11, for "propionic" read -- acetic --.

Signed and sealed this 4th day of October 1966.

(SEAL)
Attest:

ERNEST W. SWIDER　　　　　　　　　　　　　　EDWARD J. BRENNER
Attesting Officer　　　　　　　　　　　　　　Commissioner of Patents